United States Patent

Umetani et al.

[11] Patent Number: 5,528,655
[45] Date of Patent: Jun. 18, 1996

[54] METHOD AND APPARATUS FOR PRODUCING RADIOLOGIC THREE-DIMENSIONAL IMAGE

[75] Inventors: Keiji Umetani, Hino; Ken Ueda, Ome; Hisatake Yokouchi, Tokyo, all of Japan

[73] Assignee: Hitachi, Ltd., Tokyo, Japan

[21] Appl. No.: 200,518

[22] Filed: Feb. 23, 1994

[30] Foreign Application Priority Data

Mar. 5, 1993 [JP] Japan .................................. 5-045263

[51] Int. Cl.⁶ ........................................... H05G 1/64
[52] U.S. Cl. ................................ 378/98.2; 378/98.7
[58] Field of Search .................... 378/23, 98.2, 98.7, 378/24

[56] References Cited

U.S. PATENT DOCUMENTS

| | | | |
|---|---|---|---|
| 4,230,948 | 10/1980 | Storck et al. | 378/24 |
| 5,023,896 | 6/1991 | Yokouchi et al. | 378/116 |
| 5,164,977 | 11/1992 | Vlasbloem et al. | 378/146 |

OTHER PUBLICATIONS

"Practical Cone–Beam Algorithm", L. Feldkamp et al, J. Opt. Soc. Am. A/vol. 1, No. 6, pp. 612–619 (1984).
"Image Reconstruction from Cone–Beam Projections: Necessary and Sufficient Conditions and Reconstruction Methods", by B. Smith, IEEE Trans. Med. Imaging MI–4, pp. 14–25 (1985).
"A Reconstruction Algorithm from Helical Cone–Beam SPECT" by Y. Weng et al, IEEE Trans. Nucl. Sci. NS–40, pp. 1092–1101 (1993).
"Analytic Reconstruction for Helical–Orbit Cone–Beam SPECT" by C. Wu et al, IEEE Nuclear Science Symposium and Medical Imaging Conference (1993).

*Primary Examiner*—Craig E. Church
*Attorney, Agent, or Firm*—Antonelli, Terry, Stout & Kraus

[57] ABSTRACT

A radiologic three-dimensional imaging apparatus comprises a device for generating an X-ray, a two-dimensional X-ray image detector including an avalanche multiplication image pickup tube for detecting an image of an object with the X-ray transmitted therethrough, a device for producing an average intensity distribution from a plurality of intensity distributions of the X-ray transmitted image, and a device for setting the target voltage applied to the photoconductive layer of the avalanche multiplication image pickup tube for each electron beam scanning position in such a manner the target voltage is high at the central portion of the visual field of the object and low at the peripheral portion thereof.

21 Claims, 6 Drawing Sheets

METHOD AND APPARATUS FOR PRODUCING RADIOLOGIC THREE-DIMENSIONAL IMAGE

CROSS-REFERENCE TO RELATED APPLICATION

The application relates to U.S. patent application Ser. No. 109,075 filed on Aug. 19, 1993, by Umetani, et al, all disclosure of which is incorporated herein by reference.

BACKGROUND OF THE INVENTION

The present invention relates to an apparatus and a method for taking radiologic transmitted images of an arbitrary object from a plurality of directions and reconstructing a radiologic three-dimensional image of the object on the basis of the transmitted images, or more in particular to an apparatus and a method for taking radiologic three-dimensional images which is capable of producing an X-ray three-dimensional image containing information far greater in amount and a medical diagnostic capability higher than the conventional X-ray tomographic image or the conventional X-ray transmitted image obtained by digital radiography.

Conventional radiologic imaging apparatuses include the X-ray computed tomography for taking a tomographic image and the X-ray digital radiography for taking an image of an X-ray transmitted image of an object. The problem of the X-ray computed tomography is that other than a cross-section image of an object cannot be obtained. In the X-ray computed tomographic apparatus, a multiplicity of tomographic images of an object are taken and are connected with each other by image processing thereby to reconstruct an X-ray three-dimensional image. This method, however, has the disadvantage that the multiplicity of tomographic images taken lengthens the total time length of imaging. The X-ray digital radiographic apparatus, on the other hand, can produce only a two-dimensional image.

A radiologic three-dimensional imaging apparatus, as described in "X-Ray Imaging Rotary Radiographic System" by Noboru Niki, Hitoshi Sato, Tikao Uyama and Tatsuo Kumazaki, Medical Imaging Technology, Vol. 10, (1992), pp. 113 to 118, for example, is an X-ray three-dimensional imaging apparatus using an X-ray image intensifier and a conventional video camera as a two-dimensional X-ray image detector. This X-ray three-dimensional imaging apparatus is intended to take X-ray projected images of an object from a multiplicity of directions within so short a time that the movement of the object is ignorable and reconstruct an X-ray three-dimensional image of the object on the basis of the projected images. Generally, however, a two-dimensional radiologic image detector using a conventional video camera for visible image detection poses the problem that the imaging of an object having a large X-ray absorption factor is difficult and objects that can be imaged are limited. This is by reason of the fact that the dynamic range of a conventional video camera is narrow in spite of a wide dynamic range required of a two-dimensional radiologic image detector.

A conventional X-ray three-dimensional imaging apparatus comprises an X-ray image intensifier for X-ray digital radiography combined with a conventional video camera for taking a transmitted image as a two-dimensional X-ray image detector. Generally, however, the use of a two-dimensional X-ray image detector for the X-ray three-dimensional imaging apparatus undesirably allows the scattered X-rays from the object to enter the X-ray image detector.

A radiologic three-dimensional image can be produced by utilizing a plurality of X-ray projected images obtained from an object taken in various directions. A radiologic three-dimensional image is obtained by approximately applying the conventional two-dimensional image reconstruction method to a three-dimensional image reconstruction, collecting data in the three-dimensional radon region or a three-dimensional Fourier region of a three-dimensional image involved, and applying the three-dimensional inverse radon transform or the three-dimensional inverse Fourier transform to the data respectively. This art is well known and is disclosed in the references cited below, for example.

"Practical Cone-Beam Algorithm" by L. A. Feldkamp, L. C. Davis, and J. W. Kress, J. Opt. Soc. Am. A/Vol. 1, No. 6, pp. 612–619 (1984); "Image Reconstruction from Cone-Beam Projections: Necessary and Sufficient Conditions and Reconstruction methods" by Bruce D. Smith, IEEE Trans. Med. Imaging MI-4, pp. 14–25 (1985); "A Reconstruction Algorithm from Helical Cone-Beam SPECT" by Y. Weng, G. L. Zeng and G. T. Gullberg, IEEE Trans. Nucl. Sci. NS-40, pp. 1092–1101 (1993); and "Analytic Reconstruction for Helical-Orbit Cone-Beam SPECT" by Chunwu Wu, Donald L. Gunter, and Chin-Tu Chen, IEEE Nuclear Science Symposium and Medical Imaging Conference (1993).

In the above-mentioned radiologic three-dimensional imaging apparatus, an X-ray source and a two-dimensional radiologic image detector are rotated around an object while a transmitted radiologic image of the object is taken from a multiplicity of directions, so that a three-dimensional image is reconstructed from the resulting transmitted radiologic images. In the process, the object is located at the center of rotation of the X-ray source and the two-dimensional radiologic image detector. As a result, generally, a radio-logically transmitted image of an object taken at a two-dimensional radiologic image detector from a multiplicity of directions is such that the central portion of the object with a high X-ray absorption factor is located at the central portion of the image, and the peripheral portion of the object low in X-ray absorption factor and a region allowing direct X-ray incidence from the X-ray source without being transmitted through the object are located in the peripheral portion of the image.

In this radiologic three-dimensional imaging apparatus, an X-ray beam of low intensity enters the central portion and an X-ray beam of high intensity arrives at the peripheral portion of the two-dimensional radiologic image detector. The difference of the incident radiation dose between the central and peripheral portions of the two-dimensional radiologic image detector corresponds to the dynamic range required of the particular two-dimensional radiologic image detector. In the prior art described above, however, it is difficult to produce a high-quality three-dimensional image corresponding to this wide dynamic range.

Another problem of the prior art is that the contrast of a radiologic image is deteriorated by the X-ray scattered from the object incident into the two-dimensional radiologic image detector.

SUMMARY OF THE INVENTION

An object of the invention is to provide a radiologic three-dimensional imaging apparatus using a two-dimensional radiologic image detector with a wide dynamic range which obviates the above-mentioned problem and is capable of reconstructing a three-dimensional image of the object having a high X-ray absorption factor. Another object is to produce a high-quality three-dimensional image by suppressing the incidence of scattered X-rays from the object into the two-dimensional radiologic image detector. The three-dimensional image referred to herein is defined as a three-dimensional CT image using a cone-beam X-ray.

In order to achieve the above-mentioned objects, according to the invention, there is provided an apparatus and a method for taking a radiologic three-dimensional image, comprising a two-dimensional radiologic image detector which has a sensitivity distribution with a detection sensitivity higher at the central portion and lower at the peripheral portion thereof along the profile of the object in order to detect the incident radiation dose corresponding to a wide dynamic range.

According to another aspect of the invention, there is provided an apparatus and a method for taking a radiologic three-dimensional image so configured that the X-ray irradiated from an X-ray source has only the straight portion thereof transmitted through a collimator thereby to suppress the incidence of the scattered X-rays from the object into a two-dimensional radiologic image detector.

The present invention uses an avalanche multiplication image pickup tube camera for a visual image detector as a component element of a two-dimensional radiologic image detector in order to provide the two-dimensional radiologic image detector with such a sensitivity distribution that the detection sensitivity is high at the central portion and low at the peripheral portion.

Figure 1:
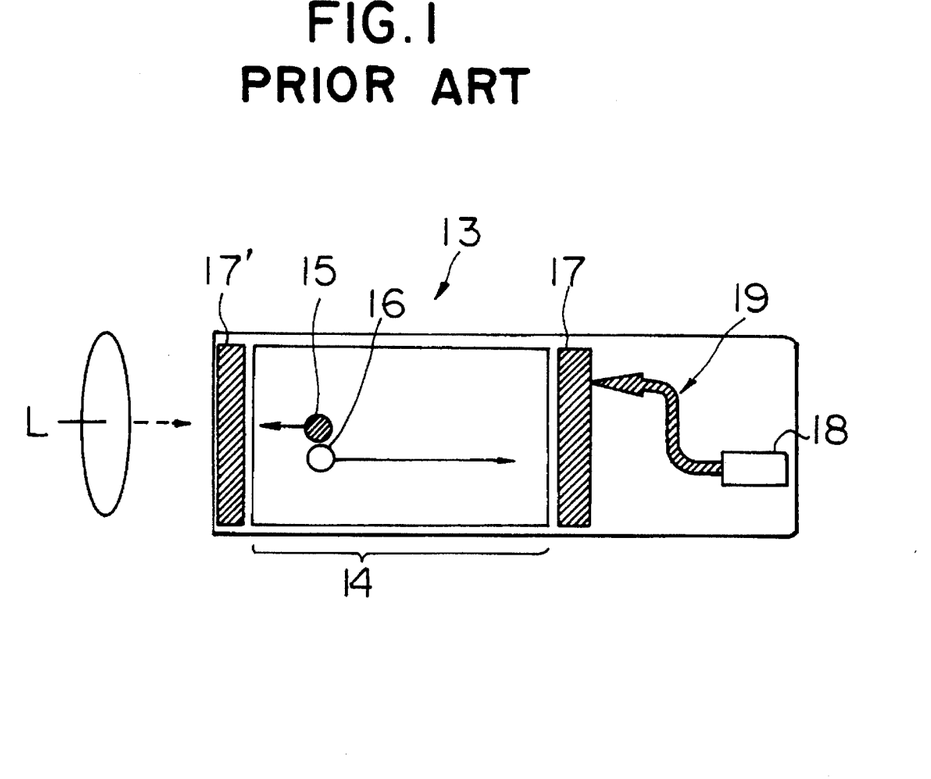
FIG. 1 shows a general configuration of a conventional image pickup tube for explaining the principle thereof.
Figure 2:
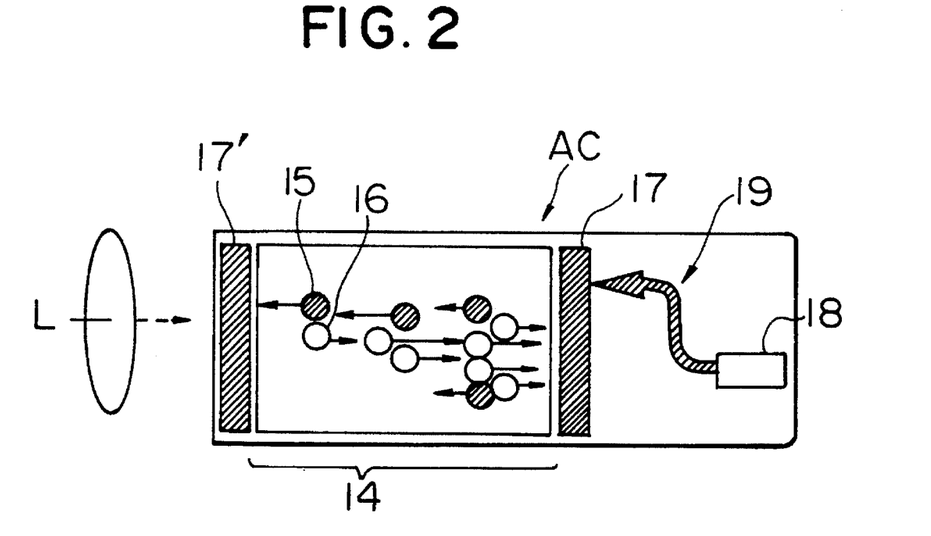
FIG. 2 is shows a general configuration of an avalanche multiplication pickup tube according to the invention for explaining the principle thereof.

FIG. 1 shows a conventional image pickup tube used with a conventional video camera, and FIG. 2 a configuration and operation of an avalanche multiplication image pickup tube used according to the invention. In FIG. 1, the image pickup tube 13 of a conventional video camera produces an electron 15 and a hole 16 as a pair in a photoconductive layer 14 of the image pickup tube 13 in the case where a ray of light L enters the image pickup tube 13 through a transparent electrode 17'. These charges move to an electrode 17 and 17' and are stored there. These charges provide an output signal of the video camera by means of a scanning electron beam 19 generated from an electron gun 18. The avalanche multiplication image pickup tube camera AC shown in FIG. 2, on the other hand, produces an electron 15 and a hole 16 as a pair within a photoconductive layer 14 of the image pickup tube as in the prior art in the case where a ray of light L is applied to the image pickup tube through the transparent electrode 17'. Since the avalanche multiplication image pickup tube has a high target voltage applied to the electrodes 17, 17' as compared with the conventional apparatuses, the charges moving in the photoconductive layer 14 are accelerated and move while strongly colliding with the atoms in the photoconductive layer, thereby producing new charges successively in avalanche. As a result, a multiplicity of pairs of charges are generated thereby to produce a large signal current in response to a single light photon. This is the principle of the avalanche multiplication operation. The degree of increase in charges due to the multiplication can be controlled by the applied target voltage. In other words, the higher the target voltage, the higher the sensitivity (multiplication factor) obtained. In view of the fact that the number of charges is multiplied up to about 1000 times by avalanche multiplication, the apparatus is used as a high-sensitivity imaging apparatus. As a result, an apparatus for taking a visible image as a visualized X-ray image is implemented, in which a high-sensitivity imaging with a low dose and an imaging with a remarkably reduced X-ray exposure are made possible.

Further, the avalanche multiplication image pickup tube has the feature that signal charges are increased by avalanche multiplication thereby to amplify the image signal component while the noise component is not substantially increased. As a consequence, a high-sensitivity image pickup tube is implemented and an imaging apparatus having a very satisfactory signal-to-noise ratio is configured.

The multiplication of the number of charges due to avalanche can be controlled by the image pickup tube target voltage applied to the photoconductive layer of the image pickup tube, thereby making it possible to adjust the output signal current to an optimum amount corresponding to the amount of incident light to the image pickup tube. This is indicative of the fact that an optimum sensitivity to the amount of incident light can be set. Thus, the sensitivity can be changed for each position of the image detection section of a visible image detector by changing the multiplication factor for each position of the electron beam scanning area by the image pickup tube, thereby making it possible to set the sensitivity distribution corresponding to a particular object.

A collimator for suppressing the incidence of scattered X-rays from an object into a two-dimensional radiologic image detector is mounted between an X-ray source and the object, and the collimated X-ray is irradiated on the object. Further, a collimator is inserted between the object and the two-dimensional radiologic image detector, whereby the scattered X-ray components from the object are absorbed, while only the X-ray component collimated by the collimator between the X-ray source and the object is transmitted. Consequently, the entrance of the scattered X-rays from the object into the two-dimensional radiologic image detector is appropriately suppressed.

According to the invention, not only an X-ray transmitted image of a portion of an object is produced but also a three-dimensional image of the object is obtained from a multiplicity of X-ray transmitted images. Therefore, the imaging the contour of the objects important to reconstruct the three-dimensional image. It is thus necessary to detect the X-rays also from the portions completely opaque to the object (sightly outside of the contour).

DESCRIPTION OF THE PREFERRED EMBODIMENTS

An embodiment of the invention will be explained below with reference to the accompanying drawings.

Figure 3:
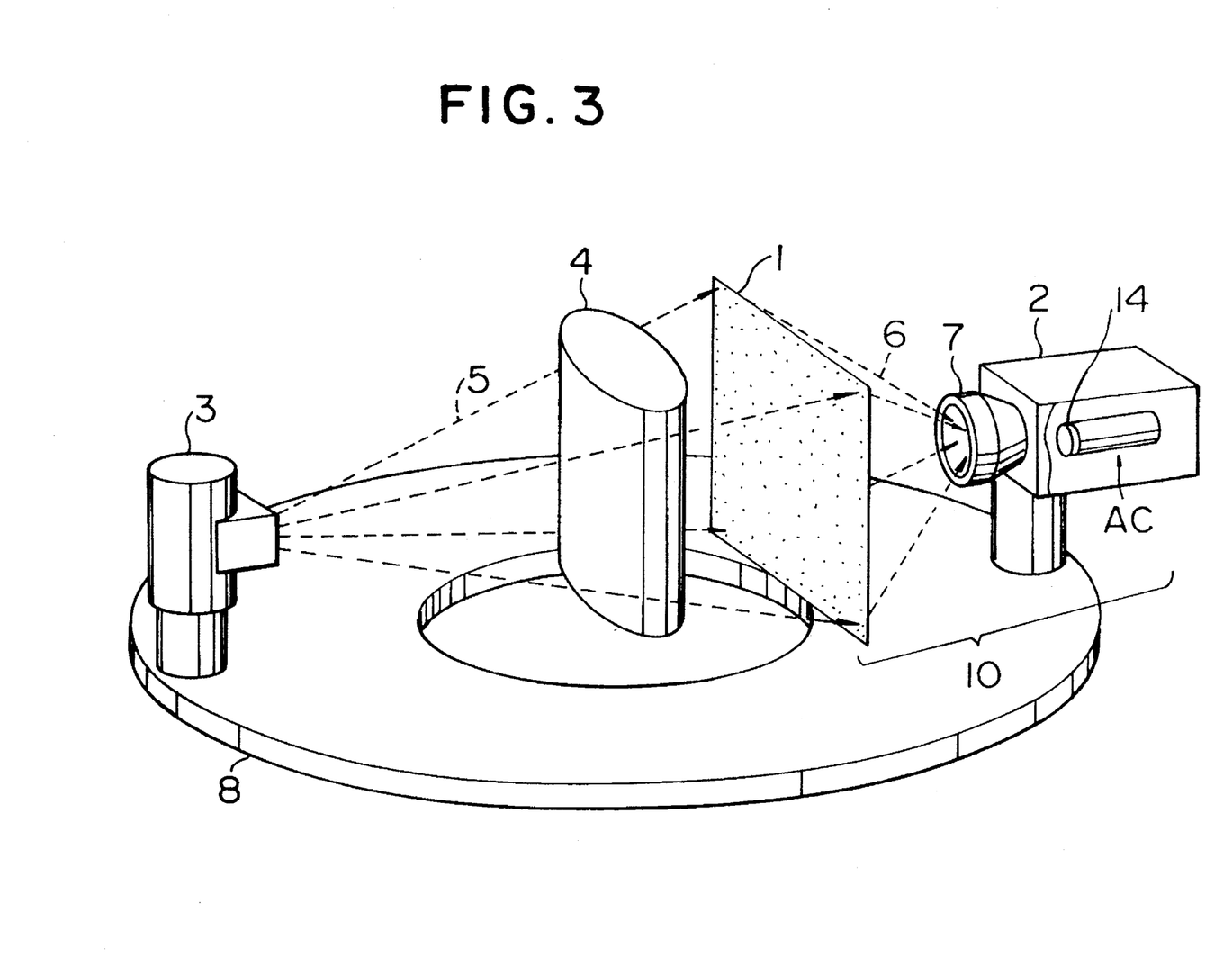
FIG. 3 shows a configuration of a radiologic three-dimensional imaging apparatus according to a first embodiment of the invention.

FIG. 3 is a diagram showing the configuration of radiologic three-dimensional imaging apparatus according to a first embodiment of the invention. In FIG. 3, an X-ray beam 5 irradiated from an X-ray tube 3 is transmitted through an object 4 and absorbed into a fluorescent plate 1, so that the X-ray image of the object is converted into a visible light image. The visible image on the fluorescent plate is focused on an avalanche multiplication image pickup tube camera 2 by a lens 7. This visible light image is detected, and an X-ray transmitted image of the object is produced as an electric signal output of the camera. The image thus obtained as an electric signal is converted into a digital signal and recorded on an image memory 37 (See FIG. 6). According to this embodiment, a two-dimensional X-ray image detector 10 includes a fluorescent plate, a lens and an avalanche multiplication image pickup tube camera.

The X-ray tube, the fluorescent plate, the lens and the avalanche multiplication image pickup tube camera are fixed on a rotary mechanism which rotates the assembly to take an X-ray transmitted image of the object from different directions. The images thus taken from a multiplicity of directions while rotating the imaging apparatus sequentially by the rotating mechanism are recorded in the image memory and processed for reconstruction by an image processing unit thereby to produce an X-ray three-dimensional image.

Figure 4:
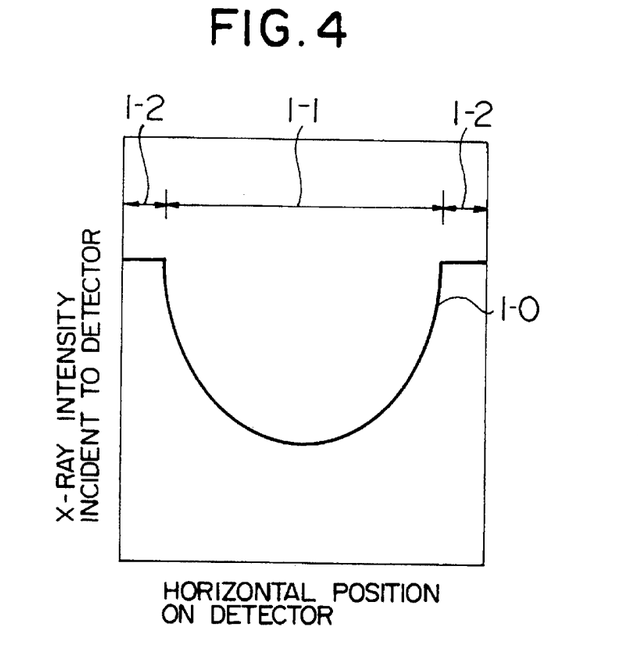
FIG. 4 is a graph showing the intensity distribution of the X-ray beam entering a two-dimensional X-ray image detector according to the first embodiment.

FIG. 4 is a diagram showing the intensity distribution of the X-ray beam entering the two-dimensional X-ray image detector 10 according to the first embodiment of the invention. The intensity distribution shown in FIG. 4 is in the horizontal direction to the object. The curve 1-0 representing the intensity distribution of the incident X-ray beam on the fluorescent plate consists of a region 1-1 entered by the X-ray transmitted through the object and a region directly entered by the X-ray from an X-ray tube. Further, the region entered by the X-ray beam transmitted through the object has an intensity distribution reflecting the amount of X-ray absorption for each portion of the object. Unless the object is hollow in construction, the intensity distribution of the X-ray beam transmitted through the object is low at the central portion and high at the peripheral portion thereof. As a result, the intensity distribution of the incident X-ray beam on the fluorescent plate is such that the X-ray intensity is the highest at the peripheral portion of the fluorescent plate where the X-ray beam enters directly from the X-ray tube and very low at the central portion of the fluorescent plate where the X-ray beam is transmitted through a portion of the object having a large amount of X-ray absorption.

The X-ray image that has entered the fluorescent plate is converted into a fluorescent light which is a visible light and is produced as a visible light image proportional to the X-ray beam intensity. This visible light image is focused on the image detecting portion of the avalanche multiplication image pickup tube camera. In the conventional video cameras, the problem was that the signal portions of high intensity are saturated against the incidence of light having a large intensity distribution and are not detected as an image.

Figure 5:
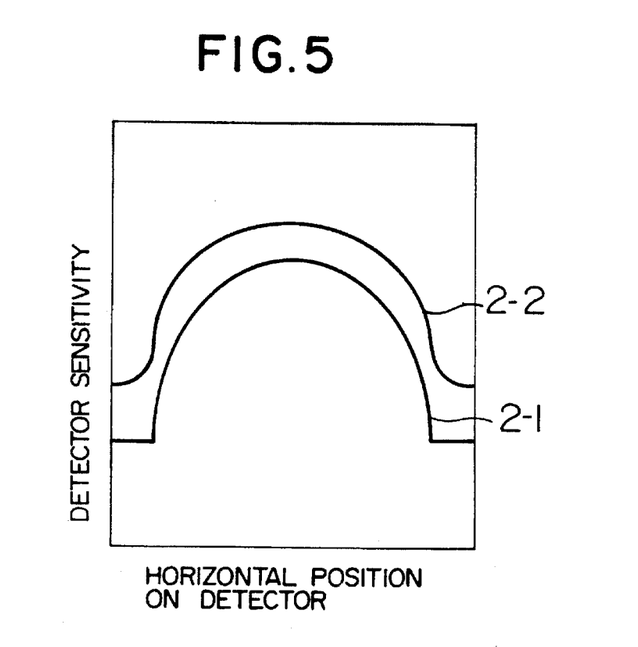
FIG. 5 is a graph showing the sensitivity distribution of the X-ray beam entering a two-dimensional X-ray image detector according to the first embodiment.

According to the invention, the sensitivity of the avalanche multiplication image pickup tube camera is set high at the central portion and low at the peripheral portions of the image. FIG. 5 is a diagram representing a sensitivity distribution for the two-dimensional X-ray image detector 10 according to the first embodiment of the invention. In FIG. 5, the sensitivity distribution of the incident X-ray beam on the fluorescent plate is plotted in correspondence with the case of FIG. 4. The sensitivity distribution curve 2-1 of the detector 10 is inverted from the curve 1-0 representing the intensity distribution of the incident X-ray beam on the fluorescent plate shown in FIG. 4. Once an object image is taken with the sensitivity distribution set in this way, an X-ray transmitted image of the object is produced with a substantially uniform brightness and a high image quality only for the fine internal structure thereof. In other words, even for the incidence of light having a large intensity distribution, the intensity distribution can be compressed in taking an image. This indicates that the dynamic range of the image detector is substantially enlarged. Further, if the X-ray three-dimensional image is to be reconstructed, images are taken from a multiplicity of directions with an identical setting of sensitivity distribution of the avalanche multiplication image pickup tube camera. For this purpose, the sensitivity distribution of the avalanche multiplication image pickup tube camera is set in such a manner that the sensitivity for the central portion is high and that of the peripheral portion low as shown in the sensitivity distribution graph 2-2 which is obtained by taking an average of intensity distribution of X-ray transmitted images of the object from multiple directions and by processing the average of distribution to produce a setting of sensitivity distribution. More specifically, the voltage applied to the photoconductive layer for detecting the image by the avalanche multiplication image pickup tube camera is changed for each electron beam scanning position of the image pickup tube thereby to set the sensitivity distribution in such a manner that the light detection sensitivity is high at the central portion of the electron beam scanning area and low at the peripheral portion thereof.

In the description of the present embodiment, the distribution in the horizontal direction of the object is exemplified for the intensity of the incident X-ray beam in FIG. 4 and the sensitivity of the two-dimensional X-ray image detector in FIG. 5. In view of the fact that the object has a three-dimensional structure, however, an intensity distribution of the incident X-ray beam of course exists also in the vertical direction of the object. As a result, the sensitivity distribution of the two-dimensional X-ray image detector shown in FIG. 5 varies with the scanning electron beam of the avalanche multiplication image pickup tube camera. Thus the sensitivity distribution of the two-dimensional X-ray image detector has a two-dimensional sensitivity distribution. A method of providing this two-dimensional sensitivity distribution to a two-dimensional X-ray image detector is explained below.

This method is disclosed in detail in U.S. patent application Ser. No. 109,075 described above.

First, prior to the formal imaging process, a preliminary imaging is conducted with a low X-ray dose and an image signal is recorded in an image memory by analog-to-digital conversion through an image collection unit. This image is performed processing operations such as the inversion of the image signal intensity, smoothing and spatial frequency process, thereby preparing a sensitivity distribution control image for the two-dimensional X-ray image detector. In the formal imaging operation, the sensitivity of the avalanche multiplication image pickup tube camera is controlled on the basis of the image signal level of the sensitivity distribution control image in the image memory corresponding to the electron beam scanning position synchronizing the timing with the electron beam scanning of the avalanche multiplication image pickup tube camera. More specifically, the target voltage of the image pickup tube applied to the photoconductive layer of the avalanche multiplication image pickup tube camera is controlled on the basis of the signal level of the sensitivity distribution control image, thereby controlling the sensitivity of the avalanche multiplication image pickup tube camera. This system permits imaging by a two-dimensional X-ray image detector having a two-dimensional sensitivity distribution, thereby making it possible to take a wide dynamic range image of an object having a three-dimensional structure. In order to take X-ray transmitted images of an object from different directions, an image for controlling the sensitivity distribution of the two-dimensional X-ray image detector is prepared on the basis of the intensity distribution of an X-ray transmitted image taken preliminarily from different directions of the object. The object is imaged from a multiplicity of directions by a two-dimensional X-ray image detector having a sensitivity distribution on the basis of a sensitivity distribution control image, and the image thus obtained is reconstructed thereby to produce a high-quality X-ray three-dimensional image.

Another method of setting a sensitivity distribution is explained. In FIG. 3, suppose that the horizontal cross section of the object 4 is neither a circle nor ellipse but a more complex form. The style of intensity distribution of the image of the object shown in FIG. 4 obtained by taking an X-ray transmitted image from different angles undergoes a great change depending on the direction of imaging. For this reason, according to the present embodiment, an image for controlling the sensitivity distribution of the two-dimensional X-ray image detector is prepared in each imaging direction.

Prior to the formal imaging process, therefore, a preliminary imaging operation is performed in each direction with a low X-ray dose, and the image signal is converted into digital format by an analog-to-digital converter in an image collection unit, which digital signal is recorded in an image memory. The resulting images are performed processing operations such as inversion in image signal intensity, smoothing and spatial frequency adjustment thereby to produce an image for controlling the sensitivity distribution of a two-dimensional X-ray image detector. As a result, an image for controlling the sensitivity distribution of the two-dimensional image detector is obtained for each direction of imaging. In taking an image as a formal processing, the sensitivity of the avalanche multiplication image pickup tube camera is controlled on the basis of the signal level of the image for controlling the sensitivity distribution in the image memory corresponding to the scanning position of the electron beam. Further, the sensitivity of the avalanche multiplication image pickup tube camera is controlled for each direction of imaging on the basis of the image for controlling the sensitivity distribution of the two-dimensional X-ray image detector. This method permits an imaging operation by a two-dimensional X-ray image detector having different two-dimensional sensitivity distributions for different directions of imaging. A wide dynamic range image can thus be produced of an object having a complex three-dimensional structure. On the basis of these different images for controlling the sensitivity distribution depending on the imaging direction of the two-dimensional X-ray image detector, the object is imaged from multiple directions, and the resulting images are reconstructed into a high-quality X-ray three-dimensional image.

In an avalanche multiplication image pickup tube camera, the operation of avalanche multiplication is controllable by an target voltage of the image pickup tube applied to the photoconductive layer, and thus can be adjusted to an optimum output signal current corresponding to the amount of incident light to the image pickup tube. The avalanche multiplication permits a multiplication of up to a maximum of about 1000 times. This indicates that the dynamic range of the image detector has been enlarged to about 1000 times compared with the conventional video camera. The imaging method according to this embodiment has the feature that the use of an avalanche multiplication image pickup tube camera makes it possible to take images of an object having a very large X-ray absorption factor to reconstruct an X-ray three-dimensional image.

Figure 6:
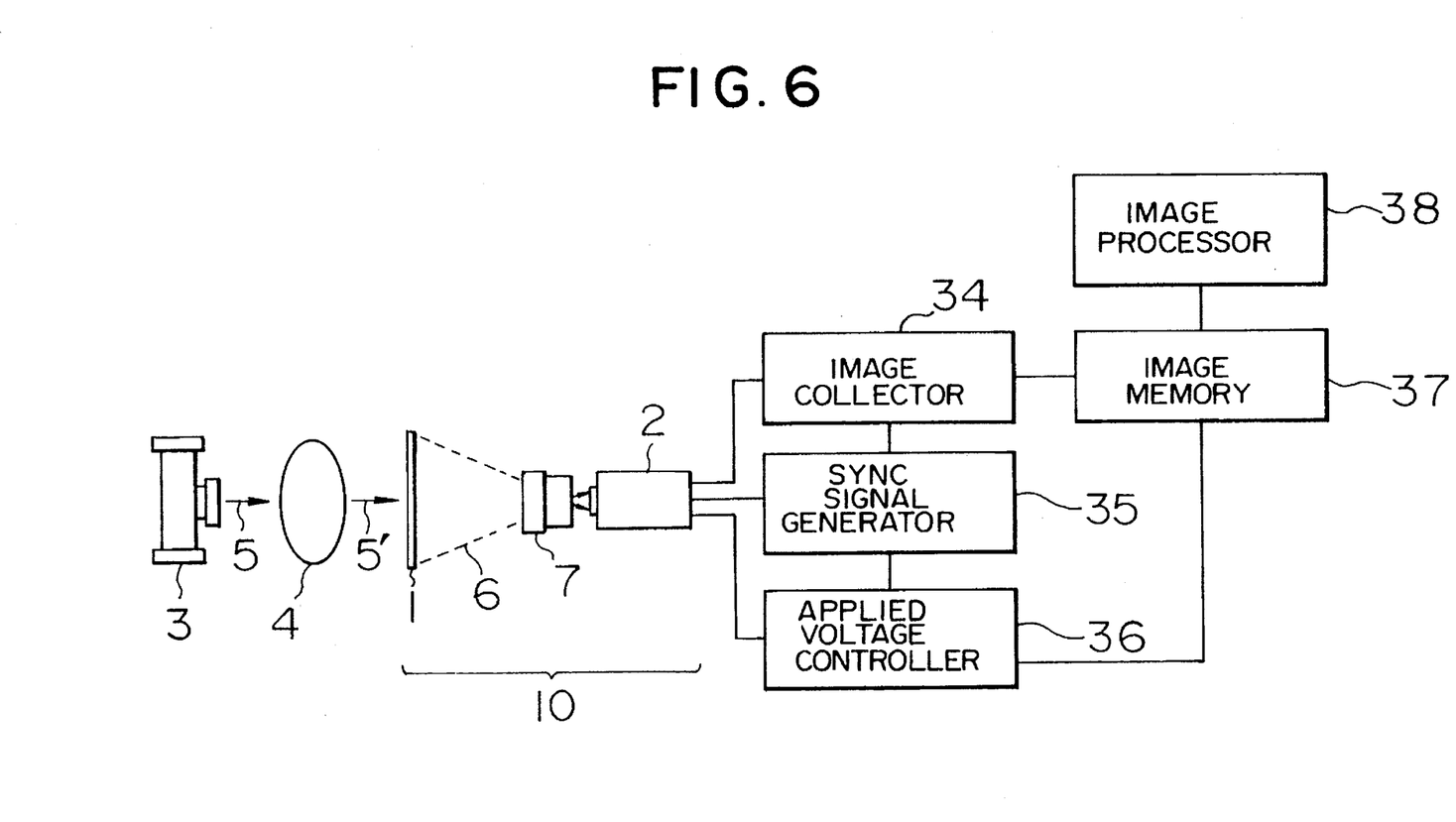
FIG. 6 is a block diagram showing the configuration of a radiologic three-dimensional imaging apparatus according to the invention.

FIG. 6 is a diagram showing a configuration of an X-ray three-dimensional imaging apparatus according to the present invention. The avalanche multiplication image pickup tube camera 2 according to this embodiment takes an output image of a fluorescent plate 1 through a lens 7. In the X-ray beam imaging, the irradiated X-ray 5 generated from an X-ray tube 3 is transmitted through an object 4 and a transmitted X-ray beam 5' is detected and converted into a visible image by the fluorescent plate 1. This visible image is taken by the avalanche multiplication image pickup tube camera 2 through the lens 7. The avalanche multiplication image pickup tube camera 2 takes a visible image under the control of an image collection circuit 34, a sync signal generating circuit 35, an applied voltage control circuit 36, an image memory 37 and an image processing unit 38. The sync signal generating circuit 35 generates a sync signal for driving the avalanche multiplication image pickup tube camera 2. The image collection circuit 34 receives an analog signal output from the camera 2 and converts the analog signal into a digital signal synchronizing the timing with the sync signal produced from the sync signal generating circuit 35. The image signal thus converted into a digital signal at the image collection circuit 34 in accordance with the sync signal is recorded as a digital signal image in the image memory 37. The image memory 37 is capable of recording and holding a plurality of images, which are performed various image processing operations by the image processing unit 38. The applied voltage control circuit 36 controls the voltage applied to the photoelectric conversion layer to control the avalanche multiplication factor of the image pickup tube of the camera 2. In particular, the applied voltage control circuit 36 has the function of adjusting the voltage applied to the electrode 17' or 17 (FIG. 2) of the photoelectric conversion layer for each position of electron beam scanning by the image pickup tube AC synchronizing the timing with the sync signal of the sync signal generating circuit 35.

According to the present invention, in addition to a combination of a fluorescent plate and an avalanche multiplication image pickup tube camera, a combination of an X-ray image intensifier and an avalanche multiplication image pickup tube camera may alternatively be used. The X-ray image intensifier is a device for amplifying the brightness of an input X-ray image by an internal electron optics system and producing an intensified visible light image. This visible light image is detected by an avalanche multiplication image pickup tube camera. The present invention implements a radiologic three-dimensional imaging apparatus of an X-ray sensitivity improved to as high as about 100 times.

In order to produce an X-ray three-dimensional image, an X-ray transmitted image of an object is taken from a multiplicity of directions, and these images are processed to reconstruct a three-dimensional image. The imaging of the object from a multiplicity of directions is performed by a rotary mechanism 8 shown in FIG. 1 by which an X-ray tube and a two-dimensional X-ray image detector are rotated around the object. An X-ray transmitted image of the object is thus taken while rotating the X-ray tube and the two-dimensional X-ray image detector around the object by the rotary mechanism in synchronizing the timing with the camera sync signal of the avalanche multiplication image pickup tube camera, thereby taking X-ray transmitted images of the object from a multiplicity of directions. Further, the X-ray beam is irradiated from the X-ray beam tube for X-ray imaging synchronizing the timing with the camera sync signal of the avalanche multiplication image pickup tube camera. In this way, according to the invention, the imaging synchronizing the timing with the camera sync signal permits an X-ray transmitted image to be taken at a very high speed from a multiplicity of directions.

The X-ray beam is irradiated during a time length shorter than the one-frame scanning period of the electron beam in the image pickup tube of the avalanche multiplication image pickup tube camera, whereby stroboscopic imaging is performed, thus making it allowable to ignore the effect of motion of the object and the movement of the irradiation point with the rotation of the rotary mechanism. With regard to the irradiation timing, on the other hand, the irradiation is performed during the frame blanking period between frames in the electron beam scanning of the image pickup tube. Further, if the irradiation time is set within the frame blanking period, the effect of the X-ray irradiation time on the image taken is eliminated appropriately, thereby producing a high-quality image.

Also, unlike in the above-mentioned embodiment, in the case where the high-speed imaging is involved using an avalanche multiplication image pickup tube camera, the imaging operation is possible with continuous X-ray irradiation. Assuming that the image read out rate by electron beam scanning of the avalanche multiplication image pickup tube camera is increased while at the same time reducing the rotational angle pitch of the rotary mechanism 8 for each imaging direction in FIG. 1 to further increase the imaging directions, the difference of the image taken with the change in the imaging angle is reduced, with the result that a high-resolution image is capable of being produced without stroboscopic imaging. According to the embodiment under consideration, images can be taken from a multiplicity of directions by continuous X-ray beam irradiation to produce an X-ray three-dimensional image of very high resolution.

Figure 7:
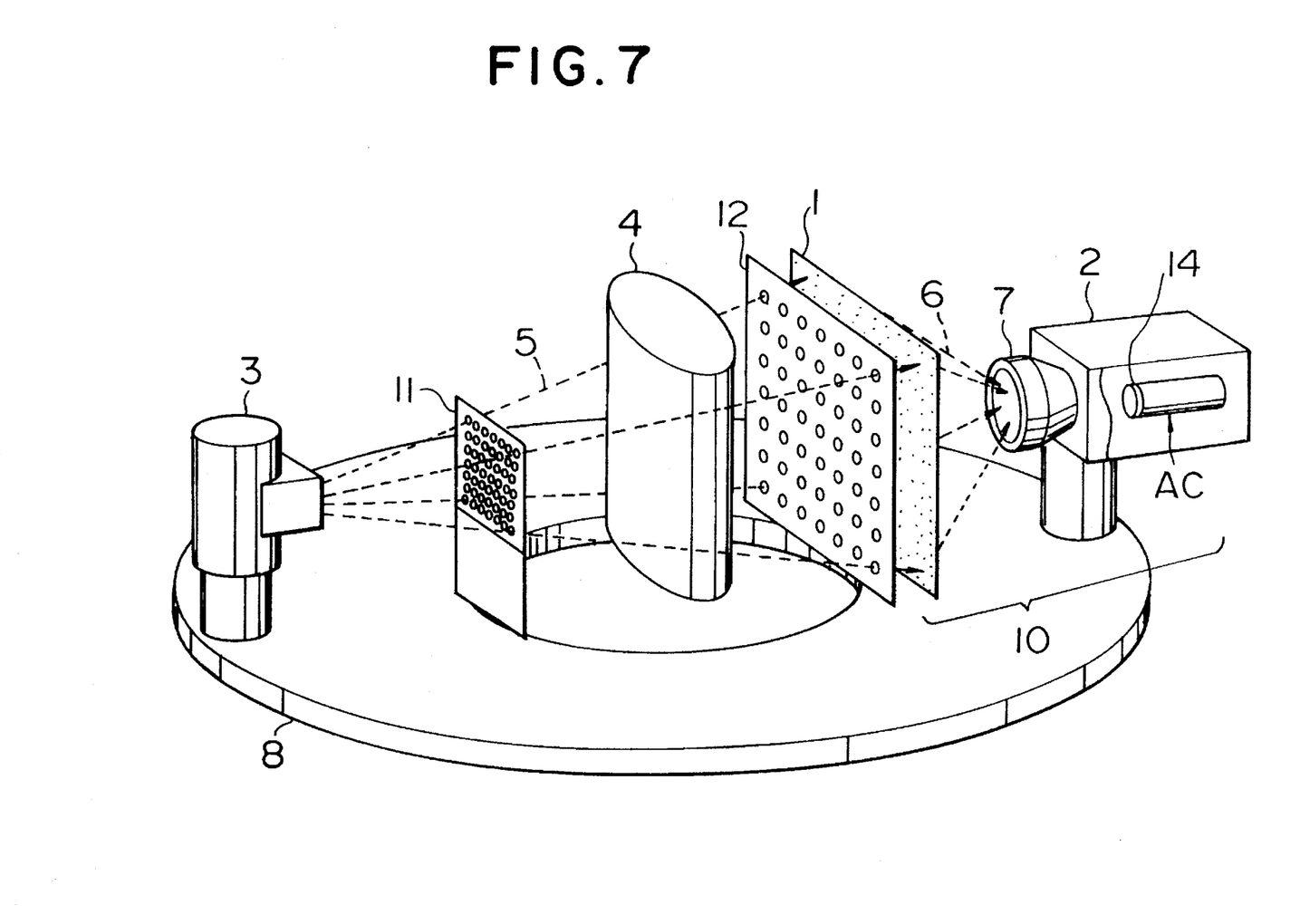
FIG. 7 shows the configuration of a radiologic three-dimensional imaging apparatus according to a second embodiment of the invention.

Apart from the digital method of controlling the target voltage of the image pickup tube applied to the photoconductive layer of the avalanche multiplication image pickup tube camera on the basis of a digital image, an analog method will be explained. In this method, a scanning control circuit of a video camera for controlling the electron beam scanning is used, so that the target voltage is controlled by a analog circuit for each point of electron beam scanning on the photoconductive layer of the image pickup tube. The analog system comprises a video camera including a waveform generating circuit, from which a waveform signal synchronizing the timing with the control signal of the scanning control circuit is used to control the target voltage. In other words, a voltage proportional to the waveform signal from the waveform generating circuit is applied as a target voltage to the photoconductive layer. The waveform from the waveform generating circuit can be set arbitrarily by adjusting the circuit constants of the waveform generating circuit in such a manner that the camera sensitivity is high at the central part of an imaging area the avalanche multiplication image pickup tube camera and low at the peripheral portion thereof. FIG. 7 is a diagram showing the configuration of a radiologic three-dimensional imaging apparatus according to a second embodiment of the invention. In the two-dimensional imaging process, the X-rays scattered from the object mix with the X-ray transmitted image, and thus reduce the image contrast, thereby degrading the image quality of the reconstructed X-ray three-dimensional image. In view of this, according to this embodiment, a collimator 11 including a two-dimensional pinhole arrangement is mounted between an X-ray tube and the object, and another collimator with a similar two-dimensional pinhole arrangement is interposed between the object and a fluorescent plate. The collimators are constructed of a plate of a material liable to absorb X-rays with a two-dimensional pinhole arrangement. First, the irradiated X-ray beam is transformed by the collimator 11 into only a component that has passed the pinhole, which is a multiplexed pencil beam forming a mass of linear beams corresponding to the two-dimensional pinhole arrangement. The multiplex pencil beam that has transmitted through the object is further transmitted through the corresponding pinholes of the collimator 12, and absorbed by the fluorescent plate to form a fluorescent light. The X-ray beam component that has been scattered by the object, however, is absorbed by the frame portions other than the pinholes of the collimator 12 and fails to reach the fluorescent plate. According to the invention, therefore, the scattered X-rays are prevented from mixing with the image taken, thus making it possible to reconstruct a high-contrast X-ray three-dimensional image.

According to the embodiment, the collimators 11 and 12 which are fixed on a rotary mechanism together with the X-ray tube and the two-dimensional X-ray image detector, are adapted to rotate around the object while maintaining the geometric orientation thereof on the rotary mechanism. The multiplex pencil beam generated by the collimator 11 is transmitted through the pinholes of the collimator 12 having an arrangement similar to that of the collimator 11. As a consequence, the pinholes of the collimator 11 and those of the collimator 12 have one-to-one positional correlationship (similarity). The size and position of the pinholes of the respective collimators are thus similar to each other.

Figure 8:
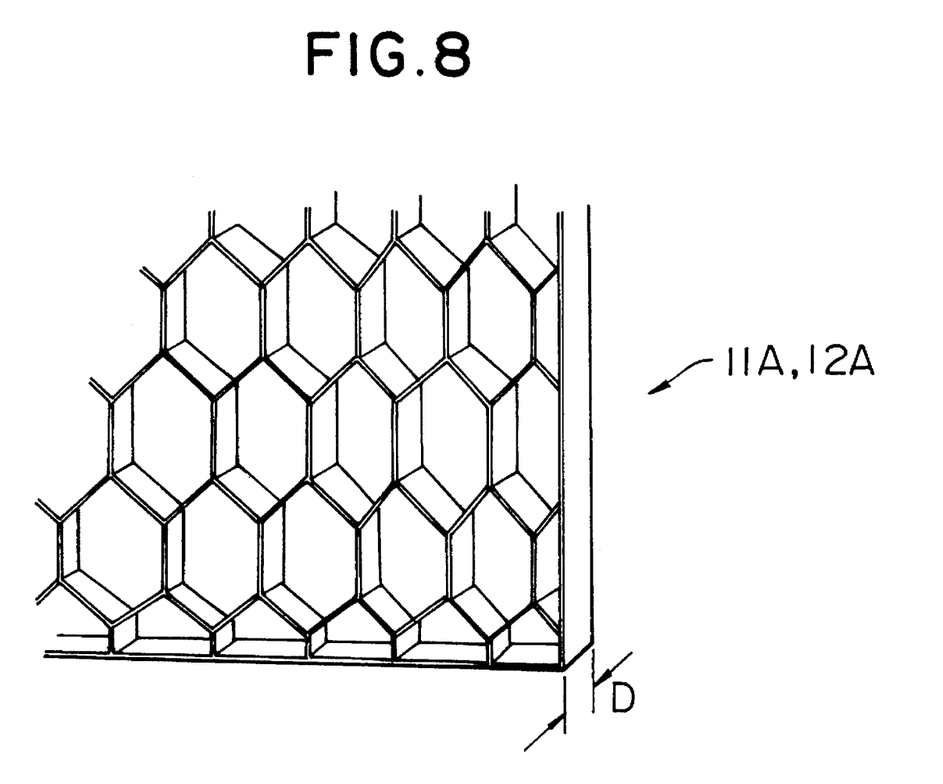
FIG. 8 is a perspective view showing a honeycombed grid collimator according to the second embodiment.

Also, according to another aspect of the embodiment under consideration, grid collimators 11A, 12A shown in FIG. 8 are used in place of the collimators 11, 12 having a two-dimensional pinhole arrangement. The grid collimators 11A, 12A are made of a material capable of easily absorbing X-rays and are honeycombed with a structure having a considerable depth D. The X-ray beam component entering the grid collimators substantially perpendicular to the grid surface is transmitted through the grid frames, while the X-ray beam component entering the same grid diagonally at a large angle is absorbed into the grid frames having a width D along the direction of beam progress and therefore cannot be transmitted therethrough. The grid collimator 11A and 12A, like the pinhole collimators, have the grid frames thereof in a one-to-one correlationship (similarity) to each other. The use of a grid collimator having a considerable depth improves the effect of suppressing the scattered X-ray components.

In the above-mentioned embodiments, an X-ray tube is used as a radiation source. In spite of this, a similar effect can be obtained by the use of an alternate type of source. Various radioactive isotopes, for example, can produce a radiologic three-dimensional image by $\alpha$ ray, $\beta$ ray or $\gamma$ ray. Also, if the particle accelerator is used, a radiologic three-dimensional image can be produced by various particle beams. Three-dimensional images due to the radiation beams can thus be made available by the apparatus according to the invention.

Although the X-ray generating means and the two-dimensional radiologic image detector are rotated in pair around a static object according to the embodiment, an alternative is to rotate the object with X-ray generating means and a two-dimensional image detector kept static.

Further, it is possible to produce a partial perspective view of the parts of the object requiring observation with the object, the X-ray generating means and the two-dimensional radiologic image detector kept in static conditions. In this case, a three-dimensional image of the object cannot be produced.

It will thus be understood from the foregoing description that according to the present invention, a three-dimensional image of even an object having a large X-ray absorption factor can be reconstructed by the use of a two-dimensional radiologic image detector having a very wide dynamic range, and therefore the image of all types of object can be taken. Also, a high-speed imaging is possible by a video camera or an avalanche multiplication image pickup tube camera used as a component element of the two-dimensional radiologic image detector. Further, the use of collimators eliminates the effect of the X-rays scattered from the object, thereby producing a radiologic three-dimensional image high in contrast.

We claim:

1. A radiologic three-dimensional imaging apparatus comprising:

X-ray generation means for generating an X-ray beam;

a two-dimensional radiologic image detector for detecting a radiologic image; and sensitivity adjusting means for adjusting the sensitivity of the central part of the visual field of said two-dimensional radiologic image detector of the visual field of said two-dimensional radiologic image detector of a high level and the sensitivity of the peripheral part of the visual field thereof at a low level in correspondence with the X-ray transmission factor of each part of an object.

2. A radiologic three-dimensional imaging apparatus according to claim 1, wherein said two-dimensional radiologic image detector includes a fluorescent plate for converting the radiologic image into a visible light image and an avalanche multiplication image pickup tube camera for detecting said visible light image.

3. A radiologic three-dimensional imaging apparatus according to claim 1, wherein said two-dimensional radiologic image detector includes an X-ray image intensifier for converting said radiologic image into a visible light image and an avalanche multiplication image pickup tube camera for detecting said visible light image.

4. A radiologic three-dimensional imaging apparatus comprising:

X-ray generating means for fenerating an X-ray beam;

a two-dimensional radiologic image detector for detecting a radiologic image including a fluorescent plate for converting the radiologic image into a visible light image and an avalanche multiplication image pickup tube camera for detecting said visible light image; and applied voltage control means for setting a voltage applied to a photoconductive layer of said avalanche multiplication image pickup tube camera for each position of electron beam scanning of said image pickup tube so that a light detection sensitivity of an electron beam scanning area is high at a central portion of said electron beam scanning area and low at a peripheral portion of said electron beam scanning area.

5. A radiologic three-dimensional imaging apparatus comprising:

X-ray generating means for generating an X-ray beam;

a two-dimensional radiologic image detector for detecting a radiologic image including an X-ray image intensifier for converting said radiologic image into a visible light image and an avalanche multiplication image pickup tube camera for detecting said visible light image; and applied voltage control means for setting a voltage applied to a photoconductive layer of said avalanche multiplication image pickup tube camera for each position of electron beam scanning of said image pickup tube so that a light detection sensitivity of an electron beam scanning area is high at a central portion of said electron beam scanning area and low at a peripheral portion of said electron beam scanning area.

6. A radiologic three-dimensional imaging apparatus according to claim 4 or 5, further comprising:

a mechanism for rotating said X-ray generating means and said two-dimensional radiologic image detector around said object synchronizing the timing with the camera synchronization signal of said avalanche multiplication image pickup tube.

7. A radiologic three-dimensional imaging apparatus according to claim 4 or 5, wherein said X-ray generating means generates said X-ray beam toward said avalanche multiplication image pickup tube camera during a time length shorter than a one frame electron beam scanning period of said image pickup tube.

8. A radiologic three-dimensional imaging apparatus according to claim 4 or 5, wherein said X-ray generating means generates said X-ray beam toward said avalanche multiplication image pickup tube camera during a frame blanking period between frames in the electron beam scanning of said image pickup tube.

9. A radiologic three-dimensional imaging apparatus according to claim 4 or 5, further comprising first and second collimators having a multiplicity of pinholes in two-dimensional arrangement respectively interposed between said X-ray generating means and said object and between said object and said two-dimensional X-ray image detector, and a mechanism for rotating said X-ray generating means and said two-dimensional X-ray image detector around said object, wherein said pinhole collimators are fixed on said rotary mechanism.

10. A radiologic three-dimensional imaging apparatus according to claim 9, wherein the pinholes of the pinhole collimator arranged between said X-ray generating means and said object are similar in shape to the pinholes of the pinhole collimator interposed between said object and said two-dimensional X-ray image detector.

11. A radiologic three-dimensional imaging apparatus according to claim 4 or 5, further comprising first and second grid collimators arranged between said X-ray generating means and said object and between said object and said two-dimensional X-ray image detector, respectively, and a mechanism for rotating said X-ray generating means and said two-dimensional X-ray image detector around said object, wherein said grid collimators are fixed on said rotary mechanism.

12. A radiologic three-dimensional imaging apparatus according to claim 11, wherein the grid frames of the first grid collimator arranged between said X-ray generating means and said object is similar in shape to the grid frames of the second grid collimator interposed between said object and said two-dimensional X-ray image detector.

13. A radiologic three-dimensional imaging apparatus comprising:

X-ray generation means for generating an X-ray beam;

a two-dimensional X-ray image detector including an avalanche multiplication image pickup tube for detecting the X-ray transmitted image produced as the X-ray is transmitted through an object;

means for producing an average intensity distribution from a plurality of intensity distributions of the X-ray transmitted images; and applied voltage control means for setting the target voltage applied to the photoconductive layer of said avalanche multiplication image pickup tube for each electron beam scanning position in such a manner that the target voltage is high at the central portion of visual field of the object and low at the peripheral portion thereof.

14. A radiologic three-dimensional imaging apparatus according to claim 13, further comprising means for rotating said X-ray generating means and said two-dimensional X-ray image detector around said object.

15. A radiologic three-dimensional imaging apparatus according to claim 14, further comprising a first collimator having a plurality of pinholes arranged between said X-ray generating means and said object, and a second collimator interposed between said object and said two-dimensional X-ray image detector and having a plurality of pinholes similar in position and size to the pinholes of said first collimator respectively.

16. A radiologic three-dimensional imaging apparatus according to claim 14, further comprising a first collimator having a plurality of grid frames arranged between said X-ray generating means and said object, and a second collimator arranged between said object and said two-dimensional X-ray image detector and having a plurality of grid frames similar in position and size to the grid frames of said first collimator respectively.

17. A method of radiologic three-dimensional imaging comprising the steps of:

generating an X-ray beam by the use of X-ray generating means;

irradiating said X-ray on an object;

producing an X-ray transmitted image from the X-ray transmitted through said object by a two-dimensional X-ray image detector including an avalanche multiplication image pickup tube;

producing an average intensity distribution from a plurality of intensity distributions of the X-ray transmitted images; and setting the target voltage applied to the photoconductive layer of said avalanche multiplication image pickup tube for each electron beam scanning position on the basis of said average intensity distribution by the use of said applied voltage control means in such a manner that the target voltage is high at the central portion of the visual field of the object and low at the peripheral portion thereof.

18. A method according to claim 17, further comprising the step of rotating said X-ray generating means and said two-dimensional X-ray image detector around said object.

19. A method of radiologic three-dimensional imaging according to claim 17, further comprising the steps of:

interposing a first collimator having a plurality of pinholes between said X-ray generating means and said object; and interposing a second collimator having a plurality of pinholes similar in position and size to those of said first collimator between said object and said two-dimensional X-ray image detector.

20. A method of radiologic three-dimensional imaging according to claim 17, further comprising the steps of:

interposing a first collimator having a plurality of grid frames between said X-ray generating means and said object; and interposing a second collimator having a plurality of grid frames similar in position and size to those of said first collimator between said object and said two-dimensional X-ray image detector.

21. A radiologic three-dimensional imaging apparatus according to claim 4 or 5, further comprising:

synchronizing means for synchronizing a timing with a camera synchronization signal of said avalanche multiplication image pickup tube camera for taking the radiologic image of said object from a multiplicity of directions.

\* \* \* \* \*

UNITED STATES PATENT AND TRADEMARK OFFICE
CERTIFICATE OF CORRECTION

PATENT NO. : 5,528,655
DATED : Jun. 18, 1996
INVENTOR(S) : UMETANI, et al

It is certified that error appears in the above-indentified patent and that said Letters Patent is hereby corrected as shown below:

On title page, item [73] should read as follows:

-- [73] Assignee: Hitachi Medical Corporation, Tokyo, Japan --.

Signed and Sealed this

Fifth Day of November, 1996

Attest:

BRUCE LEHMAN

Attesting Officer

Commissioner of Patents and Trademarks